United States Patent [19]
Genovese

[11] Patent Number: 5,319,393
[45] Date of Patent: Jun. 7, 1994

[54] MULTIPLE-SPOT BEAM CONTROL FOR A RASTER OUTPUT SCANNER AN ELECTROPHOTOGRAPHIC PRINTER

[75] Inventor: Frank C. Genovese, Fairport, N.Y.

[73] Assignee: Xerox Corporation, Stamford, Conn.

[21] Appl. No.: 862,154

[22] Filed: Apr. 2, 1992

[51] Int. Cl.⁵ .......................... H04N 1/21; B41J 2/435
[52] U.S. Cl. ................................... 346/108; 358/298; 346/160
[58] Field of Search ............... 346/107 R, 108, 76 L, 346/1.1, 160; 358/296, 298

[56] References Cited

U.S. PATENT DOCUMENTS

| | | | |
|---|---|---|---|
| Re. 33,931 | 5/1992 | Whitney | 355/53 |
| 3,743,378 | 7/1973 | Bousley | 359/487 |
| 4,428,647 | 1/1984 | Sprague et al. | 350/167 |
| 4,514,739 | 4/1985 | Johnson et al. | 346/108 |
| 5,063,292 | 11/1991 | Brueggemann | 250/236 |

Primary Examiner—Mark J. Reinhart
Attorney, Agent, or Firm—R. Hutter

[57] ABSTRACT

A scanner adapted to selectively discharge a charged photosensitive surface emits a plurality of light beams, with the plurality of light beams impinging on the charged photosensitive surface forming a composite light spot to discharge the charge thereon. The intensity of at least one of the plurality of light beams may be varied to adjust the position of the composite spot centroid on the charged photosensitive surface.

17 Claims, 11 Drawing Sheets

FIG. 4
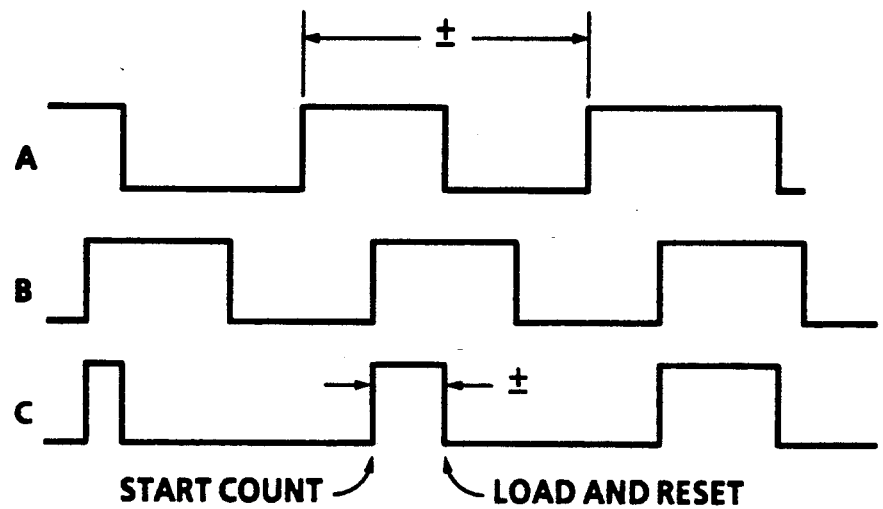
START COUNT  LOAD AND RESET
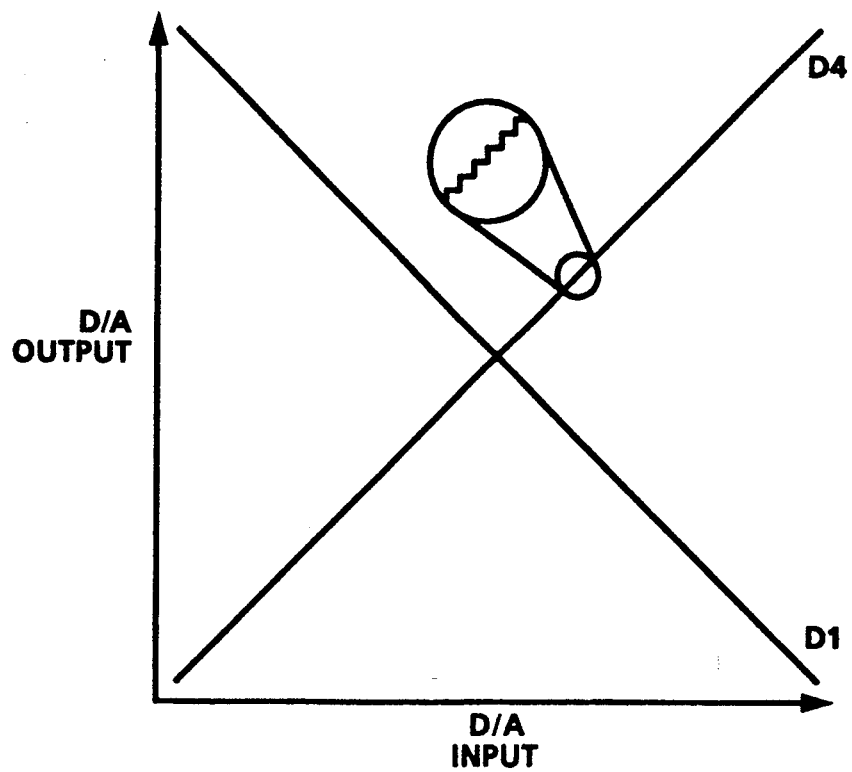
FIG. 5

MULTIPLE-SPOT BEAM CONTROL FOR A RASTER OUTPUT SCANNER AN ELECTROPHOTOGRAPHIC PRINTER

FIELD OF THE INVENTION

The present invention relates to a control system for an optical scanner as would be used, for example, in creating latent images on a photoreceptor from digital data in an electrophotographic printer.

BACKGROUND OF THE INVENTION

Electrophotographic printers wherein a laser scan line is projected onto a photoconductive surface are well known. In the case of laser printers, facsimile machines, and the like, it is common to employ a raster output scanner (ROS) as a source of signals to be imaged on a precharged photoreceptor (a photosensitive plate, belt, or drum) for purposes of xerographic printing. The ROS provides a laser beam which is modulated (switched on and off, or otherwise controlled, selectively) as it moves, or scans, across the photoreceptor. Commonly, the surface of the photoreceptor is selectively imagewise discharged by the laser in locations to be printed white, to form the desired image on the photoreceptor. The modulation of the beam to create the desired latent image on the photoreceptor is facilitated by digital electronic data controlling the laser source. A common technique for effecting this scanning of the beam across the photoreceptor is to employ a rotating polygon surface; the laser beam from the ROS is reflected by the facets of the polygon, creating a sweeping motion of the beam, which forms a scan line across the photoreceptor. A large number of scan lines on a photoreceptor together form a raster of the desired latent image. Once a latent image is formed on the photoreceptor, the latent image is subsequently developed with a toner, and the developed image is transferred to a copy sheet, as in the well-known process of xerography.

FIG. 1 shows the basic configuration of a scanning system used, for example, in an electrophotographic printer or facsimile machine. Digital data corresponding to the pixels of a desired image to be printed are input in sequence to laser source 10, which is modulated (caused to switch on and off) in response to the stream of digital data. The laser source 10 produces a collimated laser beam 12 which is reflected from the facets 13 of a rotating polygon 14. Each facet 13 of the polygon 14, in turn, deflects the collimated laser beam 12 through an imaging lens 15 to create an illuminated beam spot 16 on the pre-charged surface of photoreceptor 18. The energy of the beam spot 16 on a particular location on the surface of photoreceptor 18, corresponding to a picture element (pixel) in the desired image, discharges the surface for pixels of the desired image which are to be printed white. In locations having pixels which are to be printed black, laser source 10 is at the moment of scanning shut off so the location on the surface of photoreceptor 18 corresponding to the pixel will not be discharged by beam 12. It is to be understood that grey levels are imaged in like manner by utilizing exposure levels intermediate between the on and off levels. Thus, digital data input into laser source 10 is rendered line by line as an electrostatic latent image on the photoreceptor 18. Of course, there is a clear need for precise coordination among the flow of imagewise data input to laser source 10, and the motions of the polygon 14 and photoreceptor 18.

In a commercially-practical embodiment of such a scanning system, the resolution of an image on the photoreceptor is typically as high as 600 lines per inch. Therefore, the width of each scan line 20 on the photoreceptor is approximately 42.3 microns. This small scale of the individual scan line 20 necessarily requires very precise tolerances in coordinating the motion of the surface of the photoreceptor 18 and the spot 16 transverse thereto. In a typical imaging system using a servo motor with feedback control for velocity regulation of a drum photoreceptor, low frequency velocity errors are generally removed by the regulating action of the servo system, but because feedback bandwidth is limited, passive damping from the drive motor and drum inertia must be relied upon to suppress higher frequency errors. As a result, residual velocity errors on the order of about 1% can exist at spatial frequencies of around 0.5–2 cycles per millimeter, a scale at which the eye is most sensitive to suble fluctuations. The result on the printed document of this velocity error is referred to as "banding" or "strobing," or "hue rainbows" in a color system.

The actual positional error in a moving photoreceptor associated with these common error sources is typically on the order of a few microns or less, which is much smaller than the cross section of the typical scan line 20. Therefore, correcting for residual motion error by shifting the effective center of spot 16 in compensation need only be by a tiny amount. This shifting of the spot 16 relative to the moving photoreceptor 18 in order to ensure very uniform spacing of raster lines 22 in the process direction is generally known as "beam steering."

One object of the present invention is to facilitate beam steering in response to small positional or velocity anomalies in the movement of the photoreceptor. U.S. Pat. No. 4,428,647 to Sprague et al. describes a multi-beam scanning system wherein each laser of a semiconductor laser array has its own lens mounted adjacent to it, to change the angle of divergence of the light beams so that the light beams may be collected efficiently by an objective lens adjacent the photoreceptor. Although this patent describes a multi-beam system, the invention is concerned with modification of inherent laser source divergence and not beam steering to compensate for motion errors of the photoreceptor.

U.S. Pat. No. 4,514,739 to Johnson et al. discloses a multi-channel ROS including apparatus for detecting errors in the motion of the photoreceptor. These errors are compensated for by means of a plurality of interdigitated addressable drive electrodes. When a predetermined error limit in the position of the photoreceptor is exceeded, an error signal causes the modulation data to be shifted along the electrode array so that the beams strike the photoreceptor at a placement which corrects for the position deviation. Corrections in the position of the beam relative to the photoreceptor can be made only by discrete amounts, limited in precision by the size of the electrodes.

U.S. Pat. No. 5,063,292 to Brueggemann shows an optical system for a ROS scanner wherein the laser from the source is twice reflected off a facet of the polygon, passed through a cylindrical lens to focus the beam in the scan plane, and then reflected off a cylindrical mirror to focus the beam in a cross-scan plane.

SUMMARY OF THE INVENTION

The present invention is a scanner adapted to selectively discharge a charge photosensitive surface, by emitting a plurality of light beam elements impinging on the charged photosensitive surface forming a composite light spot to discharge the charge thereon. The intensity of at least one of the plurality of light beam elements may be varied to adjust the relative position of the effective center of exposure of the composite spot on the charged photosensitive surface in the process direction.

BRIEF DESCRIPTION OF THE DRAWINGS

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

FIG. 4 is a series of waveform diagrams illustrating the operation of the embodiment of the invention shown in FIG. 3.

FIG. 5 is a graph showing the relationship of power supplied to two semiconductor laser diode light sources in the operation of the embodiment of the invention shown in FIG. 3.

DETAILED DESCRIPTION OF THE INVENTION

Figure 1:
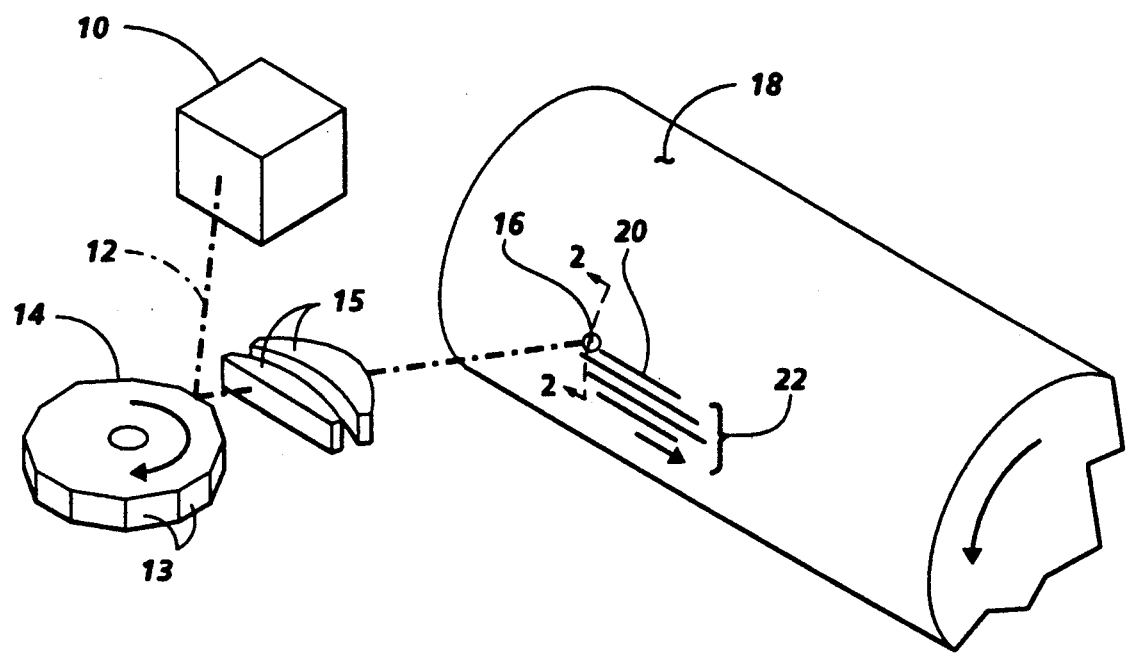
FIG. 1 is a simplified elevational view of the elements of a scanning system.

Returning to FIG. 1, it can be seen that the surface of photoreceptor 18 (in this case, a rotating drum) moves in a process direction shown by the arrow at the end of the drum. The rotation of polygon 14 causes the spot 16 created by beam 12 to move across the width of the photoreceptor 18, in a direction transverse to that of the process direction. In practical applications of such scanners as shown in FIG. 1, a crucial source of error in the creating of the electrostatic image is anomalies in the motion of the photoreceptor 18, causing irregularities in the placement of scan lines 20. Such anomalies in the motion of photoreceptor 18 may be caused by numerous factors, such as vibration from the motor rotating the photoreceptor, imprecision (such as from a gear system) in the drive train for the photoreceptor 18, or external vibrations, resulting in periodic or aperiodic variations in the path of spot 16. Generally, the interaction of the moving spot 16 and the moving photoreceptor 18 assumes smooth and continuous constant-velocity motion of the photoreceptor 18 so that the various scan lines 20 forming the raster 22 will be evenly spaced. Anomalies in the motion of the photoreceptor 18 will cause the spot 16 to deviate from an exactly parallel raster path along the photoreceptor 18, or cause an entire scan line 20 in the raster 22 to be spaced inconsistently from adjacent scan lines in the raster 22. Since errors in the motion of the photoreceptor 18 result in improper spacing along the process direction of the photoreceptor 18, adjustments to the location of the spot 16 to correct these errors must be made along the process direction. That is, correction of these anomalies is accomplished by dynamically shifting the spot 16 minute distances "upstream" and "downstream" of the process direction of photoreceptor 18, to compensate for the time dependent positional errors of photoreceptor 18.

(Although the following description of a preferred embodiment of the present invention utilizes as its basic light source a plurality of semiconductor lasers, it will be apparent that other types of light sources may be operated in accordance with many of the appended claims to carry out the invention. For example, in lieu of using a laser scanning system, it is conceivable that the light sources could be arranged on a printbar disposed close to the photoreceptor 18. Typically, such printbars do not require laser light. Similarly, instead of semiconductor lasers, it is conceivable that the light source may be in the form of a single gas laser, the beam of which is optically cut into multiple beams for purposes of the invention.)

Figure 2A:
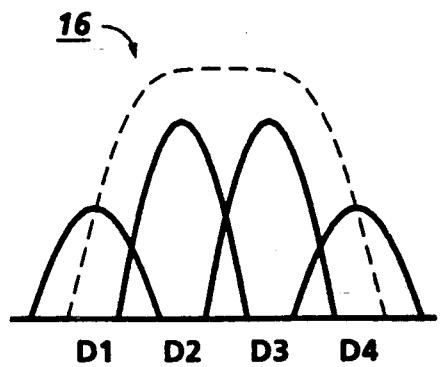
FIGS. 2A-2C are views of the intensity profiles of individual scan lines on a photoreceptor, as seen through the cross-section of line 2—2 in FIG. 1.
Figure 2B:
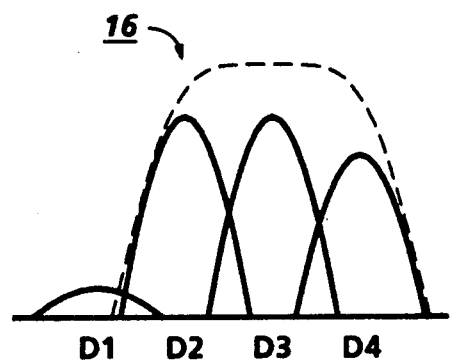
Figure 2C:
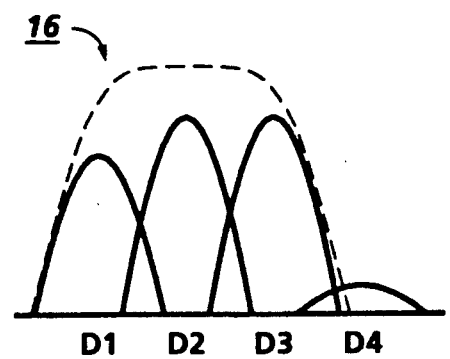

FIGS. 2A, 2B, and 2C show intensity profiles of spot 16 forming scan line 22, in cross-section through line 2—2 of FIG. 1, illustrating how the present invention accomplishes "beam steering," that is, the adjustment by minute distances of the intensity profile of the spot 16. In the present invention, the spot 16 is created as a composite of a plurality of overlapping, convergent elements (smaller spots) shown in the Figures as D1-D4. (In the following description, elements D1-D4 are referred to as such to distinguish them from the "spot" 16, which is the combination of numerous elements; also, spot 16 is also occasionally referred to as beam 16, as a "spot" is merely the manifestation of a beam on the photoreceptor.) The elements D1-D4 forming the spot 16 are represented in the Figures as graphs plotted so that the horizontal axis refers to locations on the surface of photoreceptor 18 along the process direction of photoreceptor 18, while the vertical axis is an arbitrary scale of light intensity for the location on the surface. Each element D1-D4 corresponds to a single independently-controllable laser diode in the source 10. In the preferred embodiment shown in the Figures, four elements D1-D4 are lined up to overlap along the process direction of the photoreceptor. In these Figures, element D1 is positioned "upstream" with respect to the center of composite spot 16, while element D4 is in the "downstream" position. In the embodiment shown in FIGS. 2A, 2B, and 2C, four component elements form the entire composite spot 16, and the outer elements D1, D4 are intended to overlap with the outer elements in adjacent scan lines 20 forming the raster 22 as it is formed on photoreceptor 18.

When the four convergent beam elements D1–D4 are together focused with overlapping spacing to form a single composite spot 16 on the photoreceptor 18, each individual element D1–D4 creates on the surface of photoreceptor 18 a distribution of light intensity which is at least generally "normal", that is, with a single mode of greatest intensity and trailing off in intensity away from the central mode. These normal distributions are shown as the curves in FIGS. 2A–2C. The particular intensity curves for elements D1–D4 in the Figures are in the nature of truncated or "clipped" Gaussian distributions, with the outer parts of each distribution curve being absent because of the nature of the particular laser source; however, other variations on this generally normal distribution are possible. When these four normal distributions are overlapped on the surface of photoreceptor 18, as shown by the dotted lines representing the sum of the intensities of the spot elements D1–D4 forming composite spot 16, the sum will itself have associated therewith a central symmetry point known as the "centroid." The centroid is best understood as the "center of gravity" of the intensity of composite spot 16. The centroid need not coincide with the point of maximum intensity in the exposure pattern due to ripples along its profile, caused by the summing of the elements D1–D4.

Starting from the basic case, in which there is no error requiring a steering of the composite spot 16, the elements D2 and D3 are produced at full power, as shown by the relatively high modes of those elements in FIG. 2A, while elements D1 and D4 are driven in a complementary mode at an average of 50% of full power, as can be seen by the relatively lower modes of beams D1 and D4. When these four overlapping elements D1–D4 are summed, the total distribution of the composite spot 16, shown as a dotted line in FIG. 2A, can be seen to have a centroid located at the exact center of the composite beam 16. It should also be remembered that the outer elements D1 and D4 will overlap in the latent image formed on photoreceptor 18 with the outer beams in adjacent lines 20 forming the raster 22. Thus, when the 50% power of D4 in the spot shown overlaps with the corresponding value of beam D1 in an adjacent spot 16, the two overlapping beams will add up to 100% power (assuming both of the adjacent points on the image require the source to be on) for a substantially continuous level of intensity along the raster 22.

FIGS. 2B and 2C show the same elements D1–D4 as in FIG. 2A, incorporating steering of the beam to shift the centroid of the composite spot 16. In FIG. 2B it can be seen that the intensity (or power) level of element D1 has been reduced, with a corresponding increase in the maximum value of element D4. The central elements D2 and D3, meanwhile, remain at full power. When the four individual elements are summed to form composite spot 16, it can be seen that the centroid (weighted exposure center) of the composite spot 16 has been displaced spatially toward element D3. However, it should also be noted that the total width of the composite spot 16 is the same as that in the base case shown in FIG. 2A, and also that the total exposing power of all elements D1–D4 taken together remains constant, as the intensity of element D4 has been increased at the expense of element D1. Thus, although the total width of the spot 16 and the total power of the spot 16 has remained constant, the centroid of the spot 16 has moved spatially within the scan line 20, which in the Figures would extend out of the page. FIG. 2C shows an opposite case, wherein the intensity of element D1 has been increased at the expense of D4, thus moving the centroid of composite spot 16 closer to the mode of element D2. Once again, total width and total power of the composite beam 16 remain constant. In FIG. 2B, it can be said that the centroid of the composite spot 16 has been moved "downstream" of the process direction of photoreceptor 18, while in the spot of FIG. 2C the centroid has been moved "upstream." By manipulation of the relative intensity values of the first and last elements in the composite spot 16, the centroid of the composite spot can be steered within the width of a scan line 20 with great precision and reproducibility.

The relative values of the first and last elements in a composite spot, which in the case illustrated in FIGS. 2A–C are labelled D1 and D4, is varied by controlling the drive current to the respective diodes corresponding to elements D1 and D4. In the preferred embodiments of the present invention, the net optical power associated with elements D1 and D4 is of a constant total value, in order to maintain the constant total power of the composite spot 16 regardless of the spatial location of the centroid. The precise value of the ratio of D1 to D4 at any given time will be varied as necessary by a detected anomaly in the motion of the photoreceptor 18. Typically, the ratio of D1 to D4 power depends of a control word which is a measure of the delay of an encoder pulse with respect to its "ideal" timing (i.e. assuming continuous motion at constant velocity). To the approximation that the optical power output is linear with input drive current, the requirement for constant net output power is satisfied by the equivalent requirement of constant net drive current.

The principle of beam steering of the present invention can be generalized as follows. For the four-element, digital-data embodiment of the invention discussed above, power, given as $P_1$–$P_4$ for elements D1–D4 respectively, is supplied as:

$$P_1 = \alpha[L];\ P_2 = P_3 = [L];\ P_4 = (1-\alpha)[L];\ \alpha < 1$$

where [L] indicates a logical 1 or 0 depending on the data for the pixel being exposed (on or off), and the beam is steered electronically by adjusting $\alpha$ as desired. The beam is nominally centered when $\alpha = 0.5$ and diodes D1 and D4 share one unit of power. For a three-element version which employs a single central diode and forms a proportionately narrower intensity profile on photoreceptor 18:

$$P_1 = \alpha[L];\ P_2 = [L];\ P_3 = (1-\alpha)[L];\ \alpha \leq 1.$$

Figure 3:
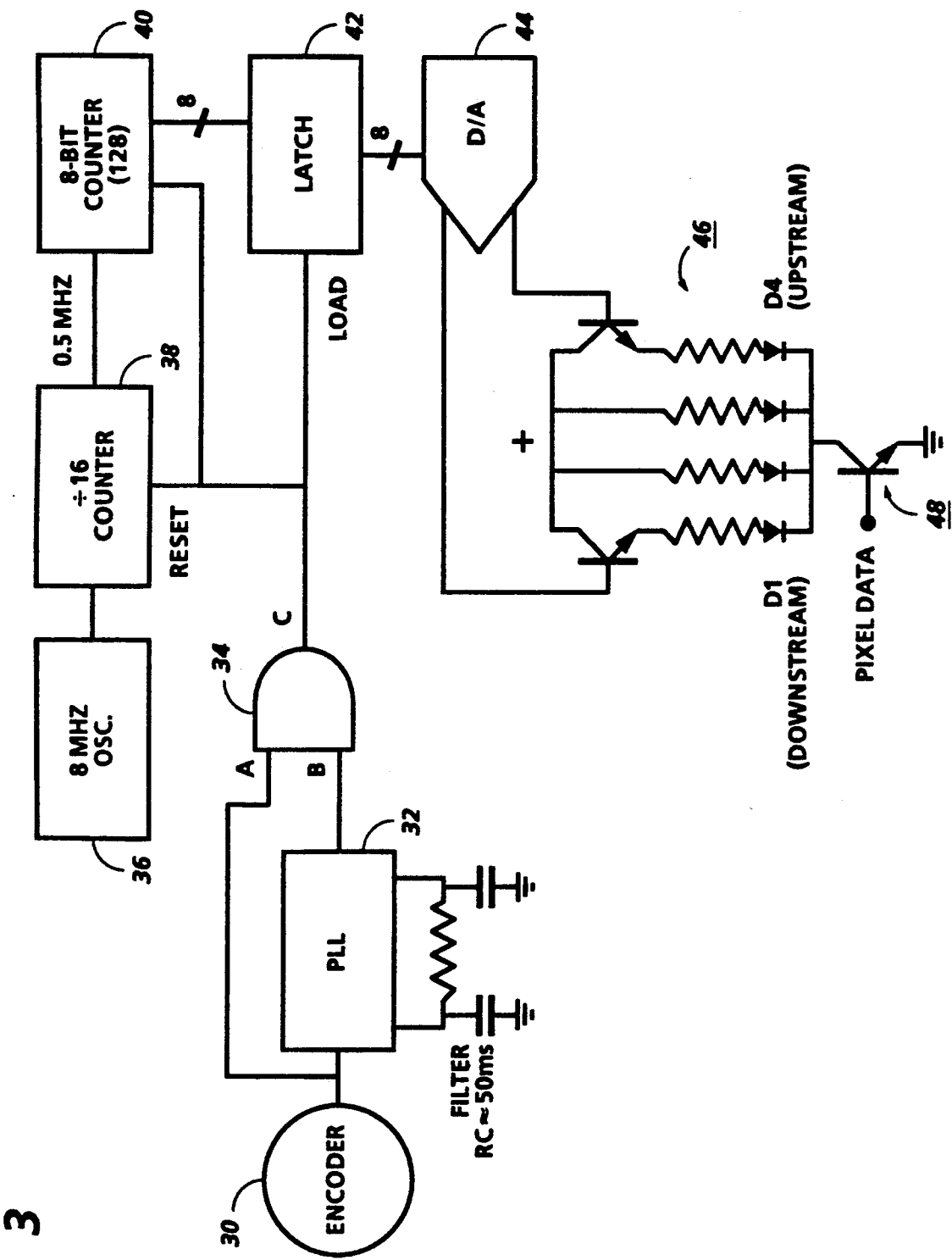
FIG. 3 is a systems diagram showing one embodiment of the beam-steering principle of the present invention, as used for motion error correction in a scanning system.

FIG. 3 is a simplified general systems diagram showing one way the beam steering principle of the present invention can be realized for error correction of a rotating photoreceptor. An encoder 30 is operationally attached to the moving photoreceptor 18 in order to monitor the physical motion thereof, in known manner. The encoder is assumed to be but is not necessarily the same one used for the motor control feedback loop. The encoder 30 produces a signal, such as an alternating digital signal, corresponding to the incremental motion of the photoreceptor 18. The output of encoder 30 is sent to a phase-locked loop 32 and also branched directly into AND gate 34. The phase-locked loop 32 locks to the encoder frequency to obtain an averaged ideal frequency representative of the ideal motion of photoreceptor 18, in the manner of a flywheel, and delivers a matching square wave delayed by approximately 90°. The time constant of the phase-locked loop 32 is chosen to be longer than the main contributions to the residual noise spectrum, i.e. 50 to 100 milliseconds, so that when locked, the output frequency of the phase-locked loop 32 will track the nominal system speed via the encoder 30, but not the residual higher frequency motion noise. With the gains and time constants properly adjusted, the position of the exposure becomes a mapping of a relatively stable frequency out of the phase-locked loop 32, rather than the instantaneous signal represented by the wavetrain from encoder 30.

Typical simultaneous examples of waveforms associated with the error correction system are shown in FIG. 4. The signal directly from the encoder 30, here shown as A, is compared to a signal B from the phase-locked loop 32 in the AND gate 34. The pulses in waveform B, from the phase-locked loop 32, lag the pulses in waveform A by approximately 90°. However, the time durations of the pulses in waveform A may not be constant, as they are in waveform B. The inconsistencies in the pulse durations of waveform A are apparent in the pulse durations of waveform C. In the system shown in FIG. 3, the time duration of each pulse of waveform C can be measured by an arrangement in which an external oscillator 36 shown having a frequency, in this example, of 8 MHz, drives counters 38 and 40 to obtain a measure of the error signal C with a resolution of 256 equally proportioned time units. In the system shown, the counters 38 and 40 are activated and stopped by the lead and trail edges, respectively, of the varying-duration pulses of waveform C, thus yielding an accurate measure of the pulse length of the error signal C, which can in turn be adapted to control the relative intensities of the beams from D1 and D4, which in turn directly affects the position of the centroid of the spot 16 on photoreceptor 18. Thus, the timed anomaly of the motion of photoreceptor 18 will appear as the output signal of encoder 30 and the upstream/downstream position of the composite spot 16 will be adjusted to compensate.

In the embodiment shown in FIG. 3, the timed value of the duration of each error signal C is loaded from the 8-bit counter 40 into a latch 42, which retains the digital word corresponding to the necessary compensation of the location of the centroid of the spot 16 supplied to a digital-to-analog converter 44. The digital-to-analog converter 44 has two complementary outputs, one controlling the output intensity of diode D1 and the other one controlling diode D4, arranged in such a way that the sum of the power output intensities of diodes D1 and D4 taken together is always a constant. Using an 8-bit counter 40 to measure the duration of the error signal C, the relative values of D1 and D4 can be adjusted to a resolution of one part in 256 units. This fine resolution between the powers of D1 and D4 translates into a relatively precise adjustment of the location of the centroid of the composite beam 16. As can be seen in FIG. 3, the steering circuit generally indicated as 46 provides a constant full power drive to the diodes for beams D2 and D3, and complementary powers supplied to the diodes for D1 and D4. (Because, in the simple form illustrated, the power incident on the photoreceptor surface as a result of elements D1–D4 bears a one-to-one relationship to the power outputs associated with diodes D1–D4, the same reference numeral will be applied to both the resulting spot element and its corresponding source diode.) Steering circuit 46 comprises, as shown, a set of laser diodes D1–D4 in parallel, with a transistor (or equivalent current source) associated with each outer diode D1 and D4. The digital-to-analog converter 44 controls the relative currents and hence output optical power of the outer diodes by supplying the bases of the the two transistors with complementary analog voltage levels, to create the desired power relationship between the outer diodes in the relationship described above. It will be apparent to anyone skilled in the electronics art that providing a precisely one to one relationship between the various output voltages of digital-to-analog converter 44 in FIG. 3 and the corresponding optical intensities delivered by outer laser diodes D1 and D4 may require a more elaborate custom circuit network different from that shown in FIG. 3 in order to accurately balance device thresholds, match slope efficiencies and compensate for second order effects that may exist in actual commercial laser diode devices when used over a wide operating range. However, for many commercially available devices, the linearity of output intensity with drive current is excellent and thresholds are sufficiently well matched such that near the nominal operating point, an elaborate network is unneccessary.

Each diode shown in the circuit 46 is the laser diode directly emitting light to the photoreceptor. The final input to the diodes D1–D4 comes from transistor 48, which will be on or off depending on whether the particular pixel in the desired image is activated (i.e., to print white) or inactivated (i.e., to print black) at a given point in the scanning of a desired image. If the particular pixel being rendered on the photoreceptor 18 at a given time is a print-black, no current will be passed through any of the transistors in steering circuit 46.

The control word which is sent from latch 42 to digital-to-analog converter 44 is a measure of the delay of the encoder pulse with respect to its ideal timing. For an error in the encoder signal corresponding to a maximum downstream limit of the centroid of the spot 16, diode D1 will be on at full power with D4 off. With a signal corresponding to the upstream limit of the encoder signal, diode D1 will be completely off with D4 at full power. The resolution of the encoder 30 and the preload value of the counter 40 are chosen so that the outputs of the digital-to-analog converter 44 are approximately balanced for the no-error case. The gain of the correction circuit controlling the degree of correction applied to diodes D1–D4, and hence the effective shift in the position of the composite beam centroid of spot 16 on photoreceptor 18 for a given timing error in signal C, can be adjusted by varying the reference voltage supplied to digital-to-analog converter 44, or, alternatively, by changing the nominal operating frequency of oscillator 36 with an appropriate change in the preload value of counter 40. Changing the reference voltage of digital-to-analog converter 44 causes the analog output voltages to be scaled proportionately so that the centroid position is shifted accordingly by a greater or lesser degree for a given timing error. Changing the operating frequency of oscillator 36 instead increases or decreases the overall sensitivity so that a given timing error in signal C causes more or less differential change in the endpoint of counter 40 and therefore the contents of latch 42 controlling digital-to-analog converter 44.

FIG. 5 is a graph showing the relative values of the drive current, and therefore the optical power emitted by D1 and D4 as a function of the digital error signal loaded into the digital-to-analog converter 44. As can be seen in the detail, since the input is digital, the diagonal lines of the graph are in fact series of unitary steps. The digital contents of latch 42 controlling the output of digital-to-analog converter 44 is linearly related to the duration of the error signal C, and thus linear with the time delay of the photoreceptor, i.e., the net position of the photoreceptor 18.

If the absolute position error of photoreceptor 18 never exceeds a fraction of a pixel (that is, a fraction of the width of a composite spot 16), the phase-locked loop 32 may be replaced by the same frequency source used as the reference for the photoreceptor speed control servo (appropriately scaled). The phase-locked loop 32 is an easy way to provide a stabilized frequency that automatically tracks the average or mean frequency of the encoder 30, and also has a relatively forgiving lock-frequency band.

In addition to anomalies in the motion of the photoreceptor 18, two other key sources of error in the placement of scan lines 20 to form raster 22 arise from imperfections in the motion of polygon 14 in moving the beam spot 16 across the photoreceptor 18, namely the error referred to as facet signature and the imperfection known as wobble.

Due to small errors in manufacture, the different facts 13 of the polygon 14 may not all be precisely aligned exactly alike with respect to the rotational axis of the polygon. Thus, as spots 16 caused by the reflections from a sequence of facets 13 on polygon 14 move transversely to the process direction of photoreceptor 18, these imperfections cause unintentional displacements of the resulting scan lines 20 upstream and downstream from their nominal path with respect to the process direction. Correction of this facet-to-facet error, commonly referred to as the "signature" of rotating polygon 14, can be incorporated in the beam steering scheme, provided it is sufficiently small, i.e., equivalent to less than a fraction of a beam width, so that the combined steering for motion quality plus facet error compensation is less than about one-third of a pixel. This can be accomplished most simply by preloading an appropriate numerical value in counter 40 from a look-up table on a dynamic scan-by-scan basis.

The imperfection known as wobble is the small aperiodic geometrical error associated with the rotation of the polygon mass and motor drive shaft in its bearings. It should be understood that in most applications of practical interest, the polygon must of neccessity rotate at a fairly high speed. Depending on the bearing type and design, there is a minimum clearance consistent with reasonable bearing life and smooth operation in the face of differential heating and operating loads. As a result, the interaction of small mechanical assymmetries, dynamic imbalances, and gyroscopic forces lead to irregular microscopic reorientations of the effective rotational axis of the polygon shaft assembly within the constraints of the bearings. This error is commonly referred to as "wobble" and tends to be aperiodic in nature. It is a common practice to lump both facet signature and wobble errors together and refer to both as "beam wobble." Both anomalies produce results equivalent to that caused by error in the motion of photoreceptor 18 itself, but it should be noted that the source of these errors is actually due to irregularities in the geometry of polygon 14 rather than variations in the motion of the photoreceptor.

Figure 6A:
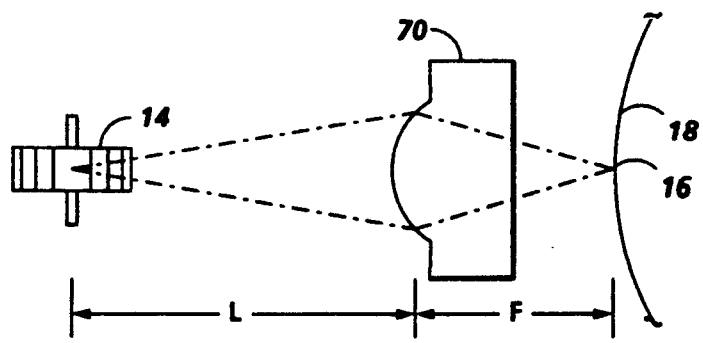
FIGS. 6A-6D are a series of plan views showing the operation of a cylindrical lens in a scanning system incorporating the beam-steering principle of the present invention.

FIGS. 6A-6D illustrate how anomalies caused by random wobble of polygon 14 may be corrected using the multi-spot system of the present invention in combination with a cylindrical lens disposed between the polygon 14 and the photoreceptor 18. FIG. 6A shows the general function of such a cylindrical lens 70. The curvature and position of cylindrical lens 70 is arranged so that divergent light from a fixed point on the surface of a facet 13 of polygon 14 will be caused to converge on the surface of photoreceptor 18. In this configuration, the object distance L and image distance F are the optical conjugates of cylinder lens 70. In the preferred embodiment being described here, the object distance L of cylindrical lens 70 is very large compared to the image distance F, so that the ratio L/F creates approximately a 30:1 reduction. Although in FIGS. 6A-6D the path L is shown as straight, it should be clear to those skilled in the art that the effective object distance L may be accommodated within a compact machine architecture by any number of simple arrangements of rigid plane mirrors.

Figure 6B:
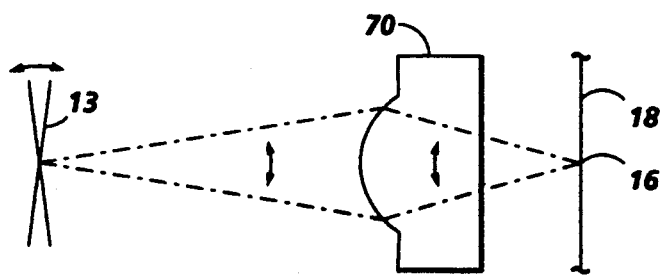

FIG. 6B shows how the orientation of a surface of a facet of polygon 14 may vary or wobble as the polygon 14 rotates. Ordinarily, such a wobble would have the effect of misplacing a spot 16 caused by the reflection of a beam from a facet of polygon 14. However, as shown in FIG. 6B, the effect of cylindrical lens 70, when so arranged in the system, is to counteract small angular errors in the geometry of polygon 14 so that a narrow beam passing from polygon 14 through lens 70 will be caused to converge toward the center of the lens 70, so that the spot 16 will be formed on photoreceptor 18 along a line parallel to the axis of lens 70, regardless of where the narrow beam actually passes through the lens 70. It will be understood by those practiced in the art that the optimum shape of cylinder 70 deviates very slightly in cross section from a perfectly circular arc.

Figure 6C:
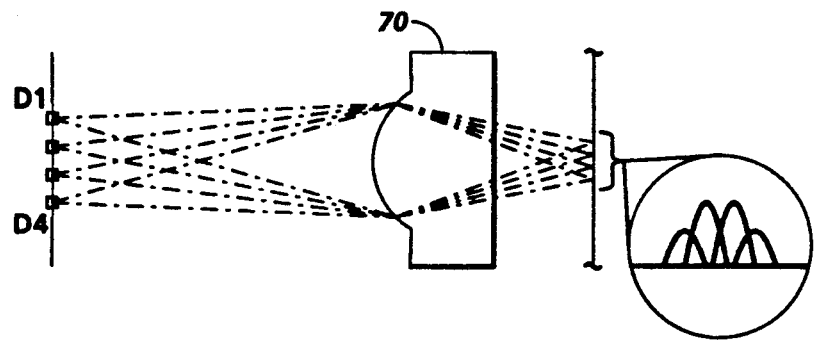
Figure 6D:
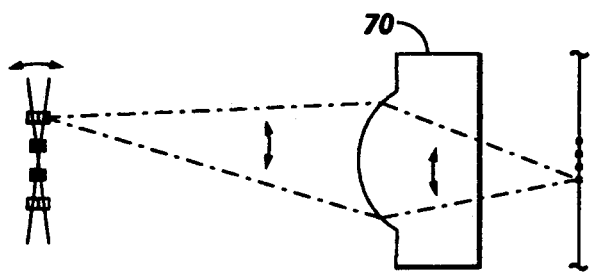

FIG. 6C is a schematic diagram showing how the four-spot embodiment of the multi-spot concept of the present invention can be incorporated into an optical scanner architecture employing a cylindrical lens 70 for the purpose of beam wobble correction. In addition to causing successive beams that may diverge at the polygon facet to reconverge at a common line on photoreceptor 18 and thereby nullify wobble, cylindrical lens 70 can be employed to redirect the individual diverging wavefronts of light emitted by virtual sources D1–D4 located at the polygon facet so that they form a converging wavefront at the surface of photoreceptor 18, generally referred to as a focus or beam waist. The four virtual sources displaced vertically at the wobble plane of a surface of polygon 14 as shown in FIG. 6C project four vertically adjacent focussed spots or beam waists on the photoreceptor 18. With a preferred ratio L/F of 30:1, cylindrical lens 70 forms an optically reduced image consisting of four spots on the photoreceptor with 1/30 of the spacing of the virtual sources D1–D4. FIG. 6D shows how the wobble correcting property of cylindrical lens 70 is simultaneously preserved for each of the individual sources.

A typical polygon beam exhibits residual wobble of the order of 1 arc minute, or 0.29 milliradians. In a scanner having commercially-practical dimensions, this means the beam wobbles up and down at the surface of cylindrical lens 70 by approximately 10 mils. The combined beam wobble and beam width at the cylinder is about 30 mils, suggesting that only a small portion of the cylinder is actually used. It has been found that a reasonable width of cylindrical lens 70 is about 5 mm. In the absence of wobble, depth of field is determined by the extent of the beam waist. When wobble is added, the extremes of the beam convergence contribute to the effective depth of focus.

Figure 7:
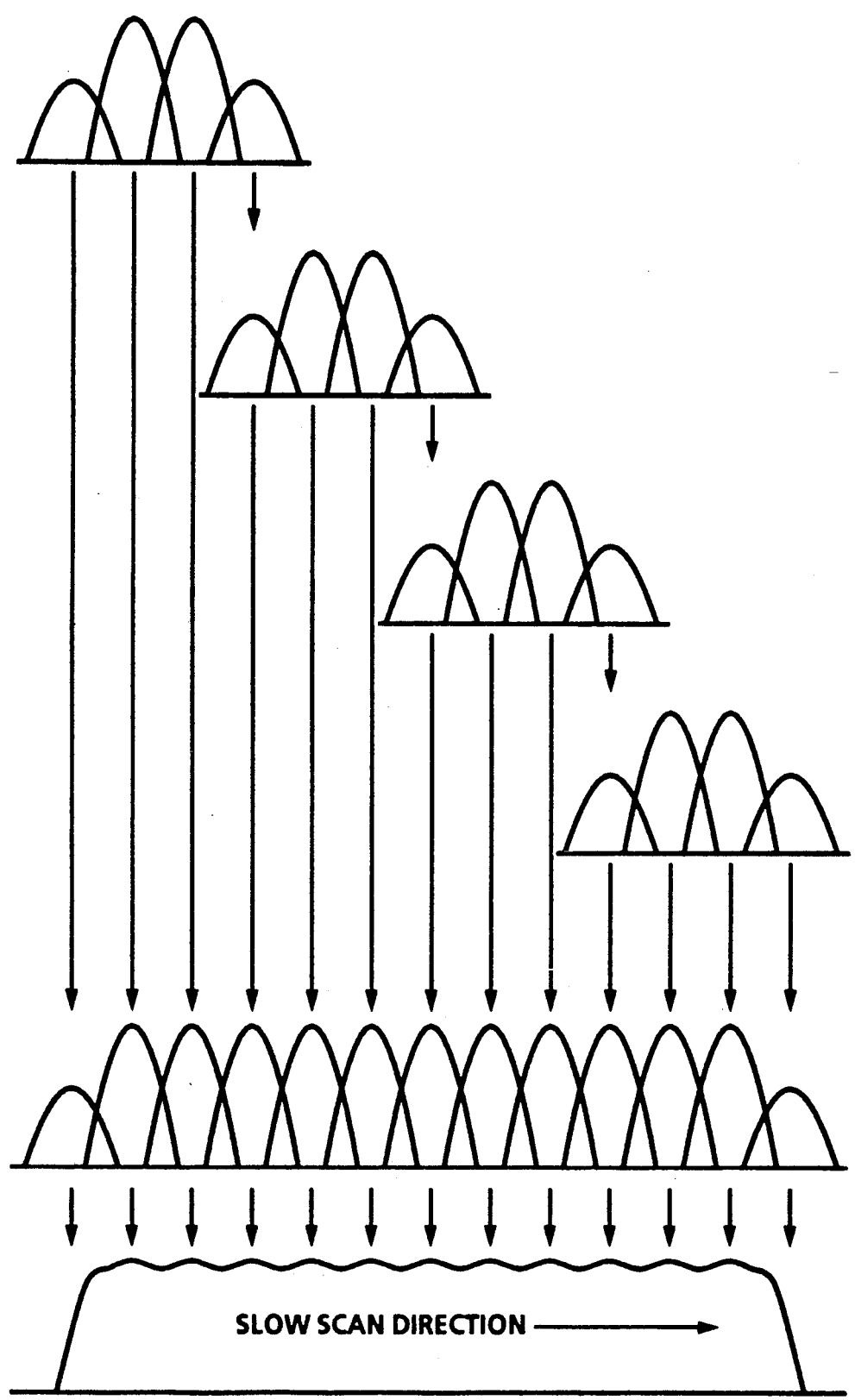
FIG. 7 is a diagram showing a series of convergent beam elements created by one embodiment of the present invention.

FIG. 7 is an extrapolation of a number of composite spots 16 strung together spatially, as would be the scan lines 20 in a raster 22. Given that the individual elements of composite spot 16 are designed to overlap within the spot at their 50% points, and the outer elements of composite beam 16 are intended to overlap the outer elements of successive scans, the nominal condition is for the outer spots to be operated at 50% power, with the result that the effective beam width of each composite spot 16 is three times the nominal width of a single element projected from each individual diode D1–D4. If a pixel in an adjacent scan line shown is print-black (with no discharging of the photoreceptor), all four elements of that pixel would be turned off during that portion of the adjacent scan. Under these conditions, the point on the photoreceptor where element D4 of the previous scan intended to be black overlaps element D1 of the succeeding scan intended to be white would be exposed at the 50% level defining the boundary between black and white pixels in adjacent scans. In the case where both pixels in succeeding scans are either black or white, overlapping two like half exposures from elements D1 and D4 on successive scans produces either 0% (D1 black+D4 black=black) or 100% (D1 white+D4 white=white) discharging of the photoreceptor, indicating a continuous exposure level in adjacent scans. In all cases, the only requirement for uniform exposure is that the elements of the composite spots are driven such that the power levels D1+D4 always equal a constant.

The foregoing description of the present invention applies to an embodiment wherein the composite spot 16 can be defined and steered with satisfactory resolution by three or four elements. The above design is most effective if the imperfections in the motion of photoreceptor 18 can be limited, by the design of the apparatus as a whole, so that the error in placement of each spot 16 is no more than about one-third the width of a pixel. In other words, because the steering range of the centroid is limited to considerably less than the width of the composite beam 16 on the photoreceptor, errors of larger magnitude cannot easily be compensated. However, the invention may be further modified for correction of larger-scale anomalies.

The beam steering by which the present invention compensates for error in the motion of the photoreceptor 18, as described above, causes the centroid of a composite beam 16 to be moved slightly "upstream" or "downstream" of the process direction in which the photoreceptor is moving. When the beam spot 16, being scanned through a plurality of lines 20 to form raster 22, is required to shift the effective center of the exposing 4-element spot more than one third its width (or one half its width in the case of a three element spot) in order to compensate for motion error, a properly "corrected" beam spot 16 cannot be produced without additional source elements to extend the displacement range of the center of the effective compound source and therefore the resulting exposing spot. That is, if the required effective displacement of beam spot 16 due to mechanical position errors of the photoreceptor surface are comparable to the fineness of the scan lines 20 forming raster 22, a modification to the correction system will be necessary.

One technique for solving the problem of large-scale optical correction is to provide a laser source 10 which is in the form of an extended array of elements adapted to transmit multiple scan lines 20 of raster 22 onto the surface of photoreceptor 18 simultaneously. The beam-steering technique of the present invention can be incorporated into such a multi-line system. With a multi-line system, for example, a plurality of individual, but overlapping, three-element scan lines can be applied to the photoreceptor 18 simultaneously. The beam steering of the present invention can be incorporated in such a way that the effective position of this wide beam array may be shifted as needed by controlling the relative intensities of the outer beam elements of each individual line simultaneously. Because the multiple lines are exposed at one time, the motion quality error (whether caused by the motion of photoreceptor 18 or the wobble of polygon 14) affects all the lines identically as they are exposed, avoiding visible defects from anomalies among lines 20.

Figure 8A:
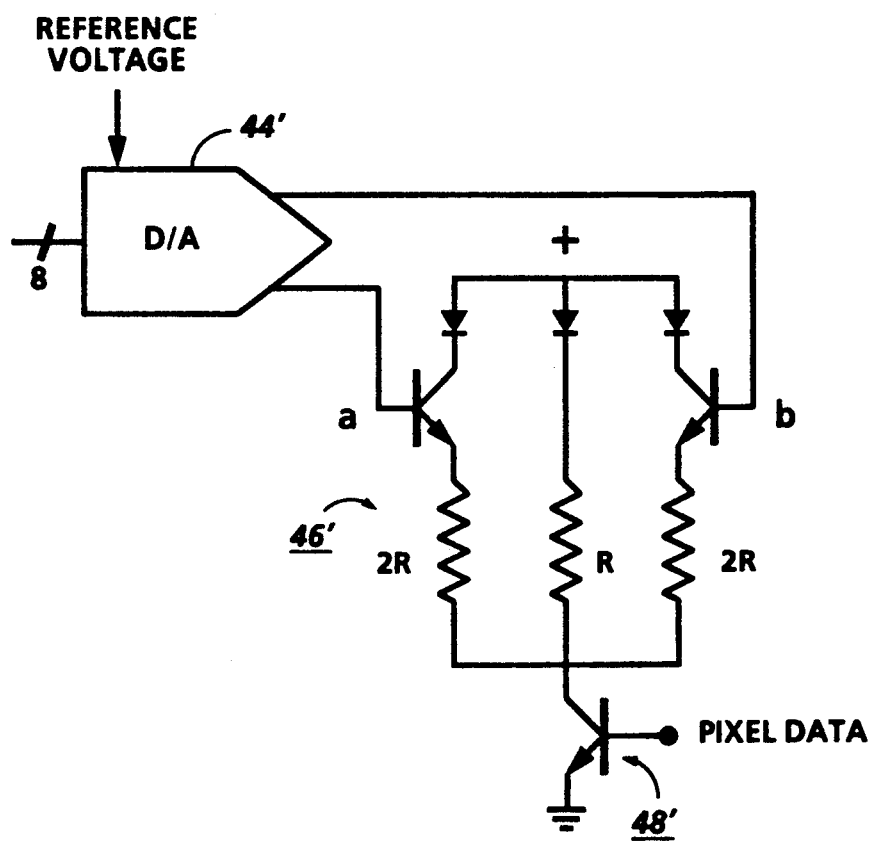
FIGS. 8A-8C are a series of circuit diagrams illustrating an alternate embodiment of the present invention.
Figure 8B:
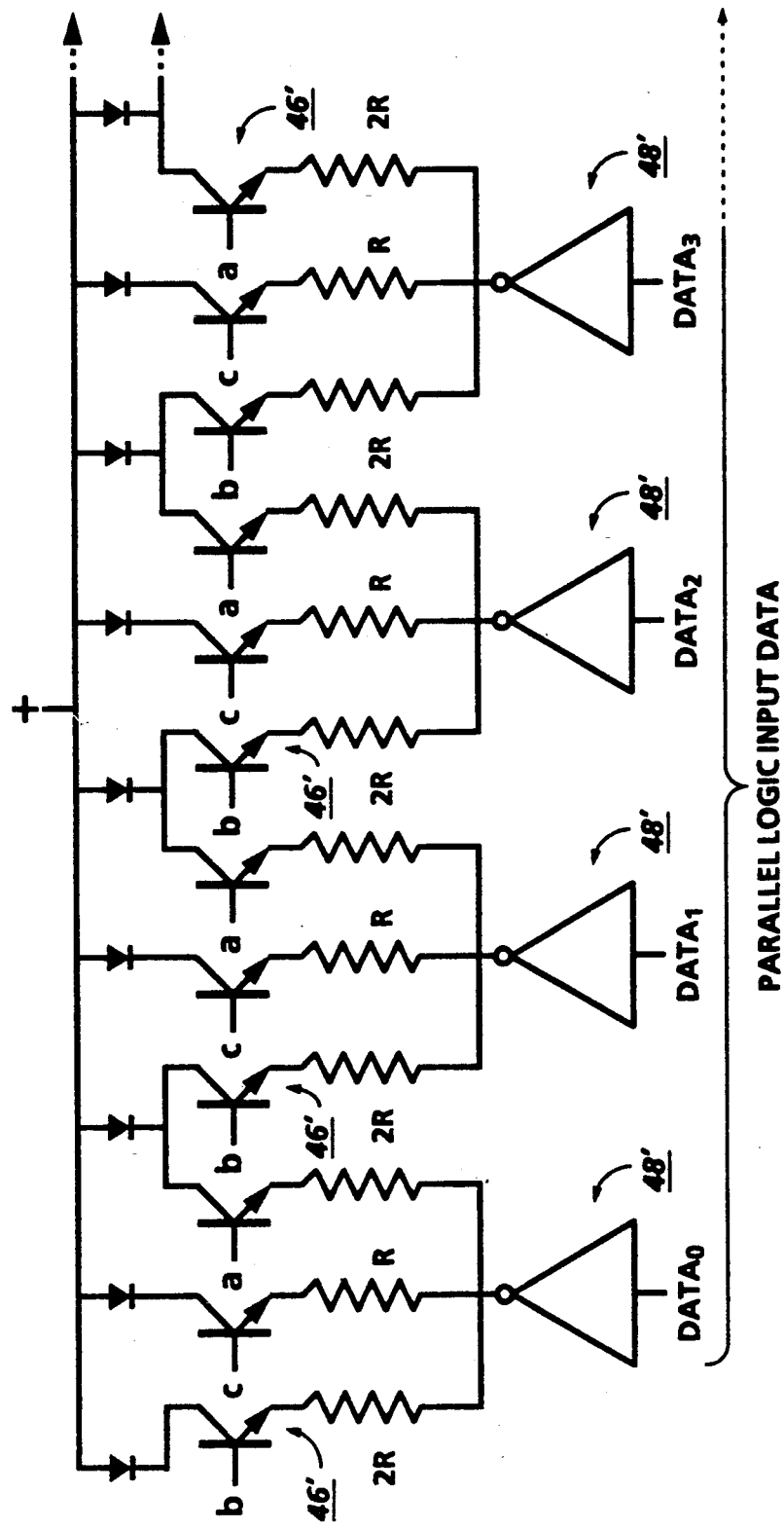
Figure 8C:
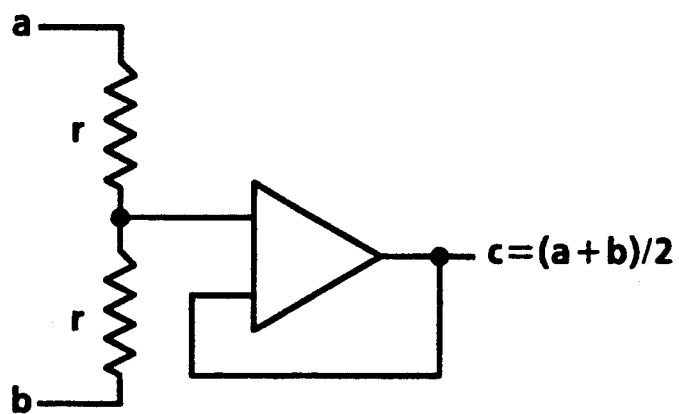

FIGS. 8A–8C show portions of circuitry by which the steering of a multiple array of scan lines 20 may be carried out. In FIG. 8A is shown circuitry by which a single composite beam spot, formed in this case by three elements, is created. The steering circuit is shown as 46' because it is merely a three-spot version of the steering circuit 46 described with FIG. 3. Similarly, digital to analog converter 44' is so marked because it functions in the same way as that in the circuit in FIG. 3. Each individual scan line in the multiple scan line of this embodiment is controlled by such a tri-spot steering circuit 46'. The imagewise data for each pixel is provided by the on-off control (here in the form of a transistor switch) 48'.

FIG. 8B shows how a plurality of steering circuits 46' may be arranged in a parallel form to convert the data from a plurality of inputs (shown as the lines marked data 0, data 1, etc) into the output of a plurality of parallel diodes. It can be seen in FIG. 8B that the different data lines controlled by switches 48' are each connected to respective steering circuits 46', which are so arranged that the outer diodes of each group are shared by the adjacent steering circuits 46'. Each steering circuit 46' includes three transistors, marked a, b, c, in parallel. One outer transistor of each output circuit 46' forms a parallel circuit with the adjacent outer transistor of an adjacent line. These adjacent outer transistors of adjacent scan lines share a diode; this permits the complementarity of outputs for the outer diodes in an adjacent line. Because all of the scan lines in a set will be steered the same amount, the power to D1 of one scan line and to the D3 (in a tri-spot system) of the neighboring scan line will always add up to full power. If one or more lines is off (i.e. to print black) at a given point in rendering the desired image, the spots D1 and D3 of the adjacent "on" lines will operate at the requisite levels of partial power consistent with the extent of steering.

FIG. 8C shows an optional circuit to be superimposed on each output circuit 46' in FIG. 8B, by which the control value of transistor c is derived from the average of the outputs to the adjacent transistors a and b for each output circuit 46'. The circuit of FIG. 8C provides an easy way to adjust overall current to the diodes so that all of the diodes scale the same way and can be controlled by the single reference voltage input to the digital-to-analog converter 44'. This is a useful arrangement for providing dynamic exposure adjustment when scan speed at the image surface is a function of scan angle, such as with certain types of projector lens.

A string of 2n+1 contiguous diodes can be used to steer n parallel exposure beams, each with different data. Because of the simultaneous motion errors affecting all of the data lines, a single steering parameter can be applied to all exposures simultaneously, i.e., power $P_0$-$P_n$ associated with diodes $D_1$-$D_n$ respectively is arranged as:

$$P_0 = \alpha[L_0];\ P_1 = [L_0];\ P_2 = (1-\alpha)[L_0] + \alpha[L_1];$$

$$P_3 = [L_1];\ P_4 = (1-\alpha)[L_1] + \alpha[L_2];\ P_5 = [L_2];$$

$$P_6 = (1-\alpha)[L_2] + \alpha[L_3];\ \ldots$$

$$P_n = [L_m];\ P_{n-1} = (1-\alpha)[L_{m-1}] + \alpha[L_m];$$

$$P_{n+1} = (1-\alpha)[L_m] + \alpha[L_{m+1}];$$

Thus, parallel data is fed directly to every other diode with intermediate diodes being proportioned with $(1-\alpha)$ from the left and $(\alpha)$ from the right-neighboring data source. As in the previous example, the beams are nominally balanced when $\alpha = 0.5$.

Figure 9A:
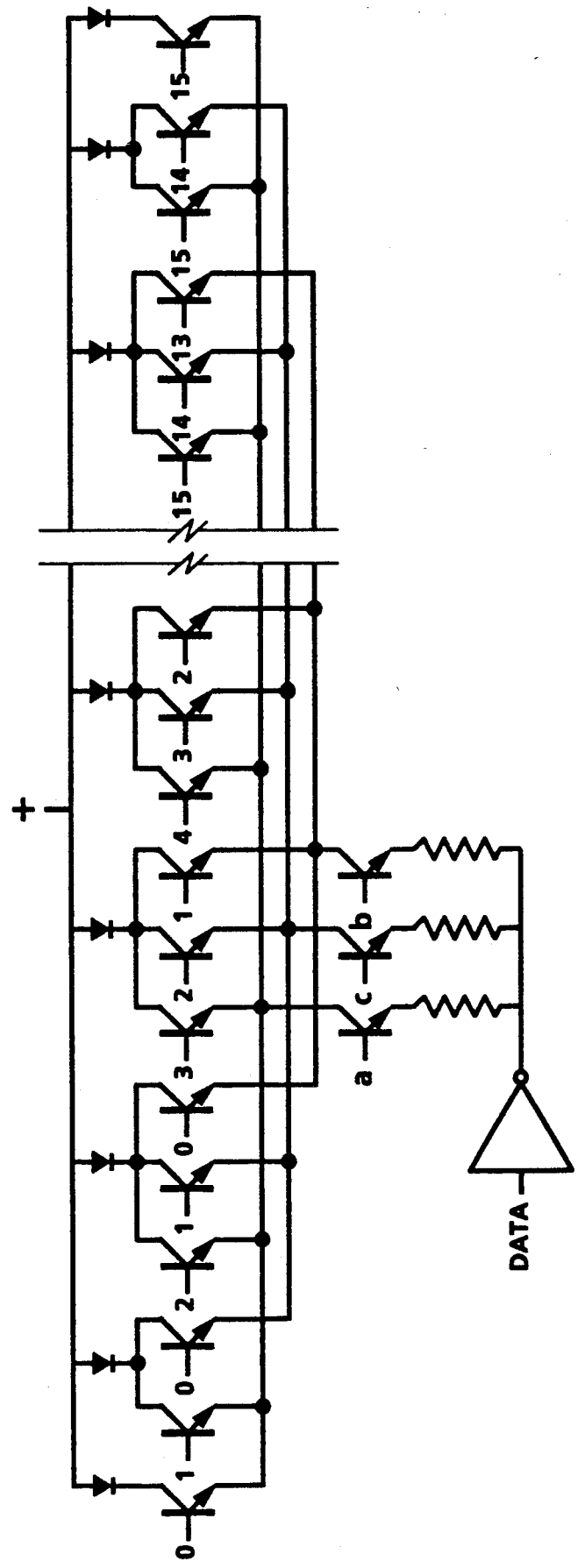
FIG. 9A is a circuit diagram illustrating another alternate embodiment of the present invention.

An architecture employing an array of sources for the simultaneous imaging of multiple scan lines in parallel lends itself to a straightforward technique for motion error correction beyond the one third and one half pixel limitations discussed for the cases of four element and three element compound spots respectively. An extended source array permits beam steering by substituting the actual data output being routed to various adjacent elements within scan lines 20 forming raster 22. That is, imagewise data being sent to form scan lines 20 can be manipulated to become, in effect, an extension of beam steering within the parallel simultaneously written scan lines. In FIG. 9, an array of diodes, each diode corresponding to a position for a single spot element on the photoreceptor, are controlled so that a selected subset of three adjacent diodes in the series of diodes can be used to create a steered three element composite beam, much as the composite beam 16 in the three element embodiment of the invention described above. Because the location of the three selected diodes will effect the position of the beam on the photoreceptor, the extent of beam location and steering can be increased simply by extending the circuit of FIG. 9A with as many diodes as necessary. Associated with each diode in the circuit is a set of three transistor switches, here numbered 1-15 to correspond with the terminals in a circuit to be discussed below, which are selectably energised to select the position along the diode array of the subset of three adjacent diodes that will be activated to form the elements of a compound spot in the desired location. For example, if it is desired to form a three element spot from the three diodes at the far left of the circuit in FIG. 9A, only those transistors marked "0" in FIG. 9A will be activated. Under this condition, drive current will be supplied only to the three diodes on the far left in the diagram. If the positional error of the moving photoreceptor is so great that the displacement of the centroid possible with steering of this first set of three diodes is insufficient, the switches marked "0" in the circuit are deactivated and those marked, for example, "1" are turned on. It can be seen from the circuit of FIG. 9A that this change from "0" to "1" will cause the activation of the second, third, and fourth diodes from the left in the Figure, resulting in the appearance of a new three element spot displaced to the right relative to the initial set by a length equal to the space between diodes. No matter which set of three diodes are selected, the active diodes are arranged in series with the three transistors a, b, c, which steer the beam by proportioning the drive current supplied to the outer two elements of the set a method exactly analogous to the embodiments of the invention described above.

The advantage of this arrangement is that, if the displacement of the three element spot (the centroid of the composite spot formed by three activated adjacent diodes) must be greater than that possible by simple beam steering, the data for the beam control is simply shifter to another set of three diodes in the next adjacent position relative to the first. The subset of any three adjacent diodes in a larger linear array may be selected as necessary, by activation of the appropriate switches to obtain the desired displacement. It should be clear to those familiar with the art that with a more elaborate switching network, more than one line of parallel data may be entered into the linear array of diodes shown in FIG. 9A. For example, the circuit could be expanded to accept not just one data line having three diodes associated therewith, but, for example, three or four adjacent lines of data, corresponding to three or four adjacent scan lines 20, and requiring a sufficient number of diode sources in the array for the activation of the number of elements associated with three or four parallel data lines. A system of N Parallel data lines will require 2N+1 diodes in a three element design, and 3N+1 diodes in four element design, plus additional end elements to satisfy the maximum correction range anticipated.

Figure 9B:
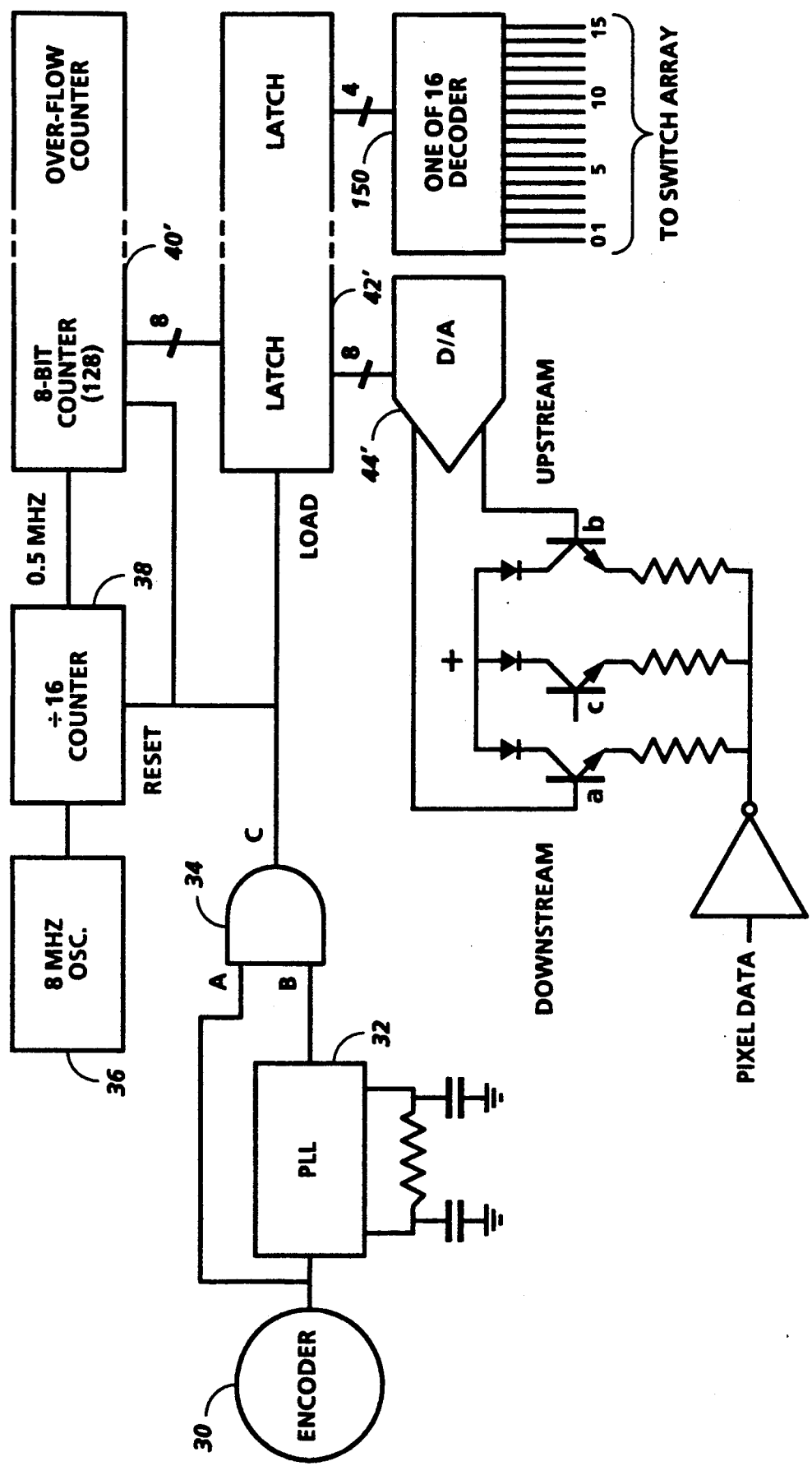
FIG. 9B is a systems diagram illustrating another aspect of this alternate embodiment.

FIG. 9B is a systems diagram showing that the arrangement of FIG. 9A can be incorporated with a motion error correction system such as that shown in FIG. 3, described above. In FIG. 3 and FIG. 9B, homologous elements are given like reference numerals. The main difference between the basic system of FIG. 3 and the expanded system of FIG. 9B, is that the eight bit counter shown as 40 in FIG. 3 (and shown in FIG. 9B its 40') includes an overflow counter, which is to say that the counter 40' would be capable of counting longer durations of timing error than an equivalent system of FIG. 3. Likewise, the extra counting capability requires extra bits for latch 42', which is identical in function to the latch 42 of FIG. 3, although with provision for more binary digits of timing data. In the embodiment shown, the most significant portion of the timing data from latch 42', that is the larger binary digits in the count, are loaded not into the digital-to-analog converter 44, but into a decoder shown as 150. Thus a division of scales for spatial compensation of the timing error is obtained: the larger binary digits are sent to the decoder 150 to control the selection of group of adjacent diodes in the circuit that are to be activated (that is, the large scale displacement of the beam spot), while the smaller digits, which may be called the "precise portion" of the timing data, corresponding to finer displacements of the composite beam, are sent to digital-to-analog converter 44, where they are used in steering the composite beam by means of the power distribution of the selected diodes. The "large-scale" data bits applied as the address input of decoder 150 selectively activate one of sixteen output lines, each output line being associated with one set of three diodes; the output lines marked 0-15 in FIG. 9B correspond to the equivalently-numbered switches controlling the diodes in the circuit of FIG. 9A.

The modified systems of FIGS. 8A–8C or 9A–9B have been used as examples to illustrate the extension of the basic beam steering mechanism to multiple scan lines for the purposes of increasing the image writing speed or data bandwidth, and extension to greater range of absolute displacement. The systems can be used not only to extend the range or precision of displacement required to correct positional error caused by the motion of the photoreceptor 18, but can also be used for the correction of errors caused by defects in the polygon 14, and can be applied as well to static and pseudostatic corrections such as repositioning the exact trajectory of scan line 22 forming raster 20 for the purposes of page-to-page image registration, removing scan line skew, and straightening scan line bow which are important issues in a precision imaging system such as a tandem color architecture.

One further variation on the system of the present invention that may be suggested is the technique of beam steering in the course of scanning in a single scan line 20. This technique may be effective in curing the common optical problems of scanning devices, known as "skew" and "bow." Skew is the error in rotational orientation of scan lines relative to the photoreceptor. Returning to FIG. 1, the scan line 20 would be rotated slightly relative to a line parallel with the axis of the photoreceptor 18. If the photoreceptor is a plate or belt, the scan line 20 may be skewed relative to an important base line, such as a line perpendicular to the edge of the belt. Further, if a number of rasters 22 are to be superimposed, such as in a color document printer, the different skews of the different rasters will cause a noticeable interference effect leading to color banding or hue shifts from point to point on the document, to the great detriment of copy quality. Bow is the quality of a scan line to form not a straight line on the photoreceptor, but a line which bows about a central midpoint. In a monochromatic printer, a slight bow of the lines in a raster is not ordinarily noticeable. However, in a color printer or copier, the different extent and/or direction of bow for each superimposed color raster can be an important cause of conspicuous color banding on the document. In manufacturing situations, it is also very common to have both skew and bow simultaneously evident in the scan line 20.

The problems of skew and bow are conducive to solving by beam steering in the course of scanning each scan line 20 in such a way that the centroid of the spot 16 is manipulated to counteract any skew or bow which is inherent in the optical arrangement of the apparatus. Static leading edge adjustment for the purpose of image registration, for example, can be provided by combining scan line reorganization for coarse image alignment with beam steering for smaller amounts of correction. To cure skew, the elements forming the spot may be dynamically adjusted to move the centroid in a direction upstream or downstream of the photoreceptor in a direction to counteract the inherent displacement error that varies linearly along the scan due to its skewed orientation. As the spot moves from the beginning to the end of the scan, the centroid will be repositioned by varying amounts to keep it centered in the desired path. Thus the spot may be displaced upstream at the beginning of the scan and downstream at the end of the scan to counteract an inherent skew of opposite sense, and therefore neccessarily passes through a point near the scan center where no displacement is applied because the uncorrected and corrected paths intersect. Bow is cured in a similar fashion, by steering the spot 16 in one direction at the ends of the scan line, and in the opposite direction toward the middle of the scan line in a gradual and continuous fashion, in order to provide a correcting displacement counteracting the inherent bow of the apparatus.

One possible way by which the intra-line beam steering suitable for skew and/or bow correction might be implemented would be to provide a beam steering control responsive to the position of spot 16 along the scan line 20 any given moment in time which is easily determined from the address of the pixel being printed at any moment. The beam steering routine, subtly varying the extent of steering as the spot 16 moves across the photoreceptor, could be controlled with a digital look-up table indexed to the facets of polygon 14 and the pixel address, and cycled with every pass of each facet 13. Such an arrangement would permit correction of bow and skew which are expected to be the same for each scan line 20, that is, for each facet 13, as well as facet signature error which depends on the facet in use.

While this invention has been described in conjunction with a specific apparatus, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A scanner adapted to selectively discharge a charged photosensitive surface, comprising:
   means for emitting a plurality of overlapping light beams, with the plurality of light beams impinging on a preselected area of the charged photosensitive surface forming a composite light spot to discharge the charge thereon, the composite light spot forming a centroid within the preselected area; and
   means for varying the intensity of at least one of the plurality of light beams to adjust the position of the composite spot centroid within the preselected area of the charged photosensitive surface.

2. A scanner as in claim 1, further including a substantially cylindrical lens disposed between the emitting means and the photosensitive surface.

3. A scanner as in claim 1, wherein the emitting means forms a composite light spot having at least two light beams overlapping one another.

4. A scanner as in claim 1, wherein the emitting means forms a composite light spot having a plurality of light beams, including a first beam and a last beam, aligned in the direction of motion of the photosensitive surface.

5. A scanner adapted to selectively discharge a charged photosensitive surface, comprising:
   means for emitting a plurality of light beams, with the plurality of light beams impinging on the charged photosensitive surface forming a composite light spot to discharge the charge thereon, the composite light spot having a plurality of light beams, including a first beam and a last beam, aligned in the direction of motion of the photosensitive surface; and
   means for varying the intensity of at least one of the plurality of light beams to adjust the position of the composite spot centroid on the charged photosensitive surface, the varying means including means for varying the relative intensities of at least the first beam and the last beam in a complementary manner.

6. A scanner as in claim 5, wherein the means for emitting a plurality of light beams creates at least one composite spot on the photosensitive surface, the composite spot having an effective width in the process direction comparable to the width of one raster line in an image to be printed.

7. A scanner as in claim 6, wherein the means for emitting a plurality of light beams includes means for emitting light beams associated with a plurality of raster lines, the plurality of light beams being arranged in subsets of light beams, each subset of beams being associated with one raster line in an image to be printed.

8. A scanner as in claim 7, wherein the means for emitting a plurality of light beams includes:
   a series of sources, each adapted to emit one light beam, and
   a variable power control for each source, each control being responsive to image data and data relating to the varying means,
   at least one control associated with each subset of beams being also responsive to image data and data relating to the varying means for an adjacent subset, when the series of sources emits light beams associated with a plurality of raster lines.

9. A scanner as in claim 7, wherein the means for emitting a plurality of light beams includes:
   a series of sources, each adapted to emit one light beam,
   a variable power control for each source, each control being responsive to image data and data relating to the varying means, and
   means for selecting from the series of sources a subset of sources to emit a plurality of beams associated with a selected raster line in an image to be printed.

10. A scanner as in claim 9, wherein the selecting means is adapted to direct parallel lines of image data corresponding to adjacent raster lines in an image to be printed to selected subsets of the series of sources, whereby at least one control associated with each subset of beams is also responsive to image data and data relating to the varying means for an adjacent subset.

11. A scanner adapted to selectively discharge a charged photosensitive surface, comprising:
   means for emitting a plurality of light beams, with the plurality of light beams impinging on the charged photosensitive surface forming a composite light spot to discharge the charge thereon;
   means for varying the intensity of at least one of the plurality of light beams to adjust the position of the composite spot centroid on the charged photosensitive surface;
   encoder means for detecting anomalies in the motion of the photosensitive surface relative to the emitting means; and
   correction means, responsive to the encoder means, for causing the varying means to adjust the position of the composite spot centroid on the photosensitive surface in response to the anomalies in the motion of the photosensitive surface moving relative to the emitting means.

12. A scanner as in claim 11, wherein the correction means includes counter means responsive to the encoder means and adapted to output a count signal derived from the motion error of the photosensitive surface relative to a signal consistent with a regular motion of the photosensitive surface.

13. A scanner as in claim 12, wherein the means for emitting a plurality of light beams includes means for emitting light beams associated with a plurality of raster lines, the plurality of light beams being arranged in subsets of light beams, each subset of beams being associated with one raster line in an image to be printed.

14. A scanner as in claim 13, wherein the means for emitting a plurality of light beams includes:
   a series of sources, each adapted to emit one light beam, and
   a variable power control for each source, each control being responsive to image data and data from the correction means relating to the varying means,
   at least one control associated with each subset of beams being also responsive to image data and data relating to the varying means for an adjacent subset, when the series of sources emits light beams associated with a plurality of raster lines.

15. A scanner as in claim 13, wherein the means for emitting a plurality of light beams includes:
   a series of sources, each adapted to emit one light beam,
   a variable power control for each source, each control being responsive to image data and data relating to the varying means, and
   means, responsive to the correction means, for selecting from the series of sources a subset of sources to emit a plurality of beams, including a first beam and a last beam, associated with a selected raster line in an image to be printed, so as to displace the composite spot on the photosensitive surface to compensate for the anomalies in the motion of the photosensitive surface.

16. A scanner as in claim 15, wherein the selecting means is adapted to direct parallel lines of image data corresponding to adjacent raster lines in an image to be printed to selected subsets of the series of sources, whereby at least one control associated with each subset of beams is also responsive to image data and data relating to the varying means for an adjacent subset.

17. A scanner as in claim 16, wherein the count signal from the counter means comprises a large-scale portion and a precise portion, and further including means for selecting subsets of the series of sources to emit light beams in response to the large-scale portion of the count signal, and means for varying the relative intensities of at least the first beam and the last beam in the selected subsets of the series of sources in response to the precise portion of the count signal.

* * * * *